United States Patent [19]

Tysoe

[11] Patent Number: 4,556,928

[45] Date of Patent: Dec. 3, 1985

[54] VEHICLE LAMP ASSEMBLY

[75] Inventor: Nicholas W. Tysoe, St. John's, England

[73] Assignee: Britax Vega Limited, England

[21] Appl. No.: 620,443

[22] Filed: Jun. 14, 1984

[30] Foreign Application Priority Data

Jul. 5, 1983 [GB] United Kingdom ................. 8318224

[51] Int. Cl.[4] ................................................ H01G 5/06

[52] U.S. Cl. ..................................... 362/268; 362/293; 362/309

[58] Field of Search ................. 362/61, 268, 293, 309, 362/308

[56] References Cited

U.S. PATENT DOCUMENTS

| | | | |
|---|---|---|---|
| 1,562,111 | 11/1925 | Matthyssen et al. | 362/61 |
| 2,170,552 | 8/1939 | Porter | 362/293 |
| 2,632,842 | 3/1953 | Grupen et al. . | |
| 4,120,018 | 10/1978 | Nagel | 362/333 |

FOREIGN PATENT DOCUMENTS

| | | | |
|---|---|---|---|
| 228661 | 7/1963 | Austria | 362/268 |
| 723352 | 4/1932 | France . | |
| 2508597 | 6/1981 | France . | |
| 2509429 | 1/1983 | France | 362/293 |

*Primary Examiner*—Andrew M. Dolinar

*Attorney, Agent, or Firm*—Hayes, Davis & Soloway

[57] ABSTRACT

A vehicle lamp assembly comprises a housing enclosed by a light transmitting cover element and having an inner portion containing a light source and an outer portion containing a lens and a reflector, both of which are arranged to collimate light from the light source parallel to a common optical axis. The reflector is arranged to direct the light collimated thereby past an edge of the lens. The outer portion of the housing is separated from the inner portion by a color filter, the assembly being so constructed as to obstruct passage of light between the cover element and the color filter except via the lens or via the reflector.

7 Claims, 2 Drawing Figures

VEHICLE LAMP ASSEMBLY

Figure 1:
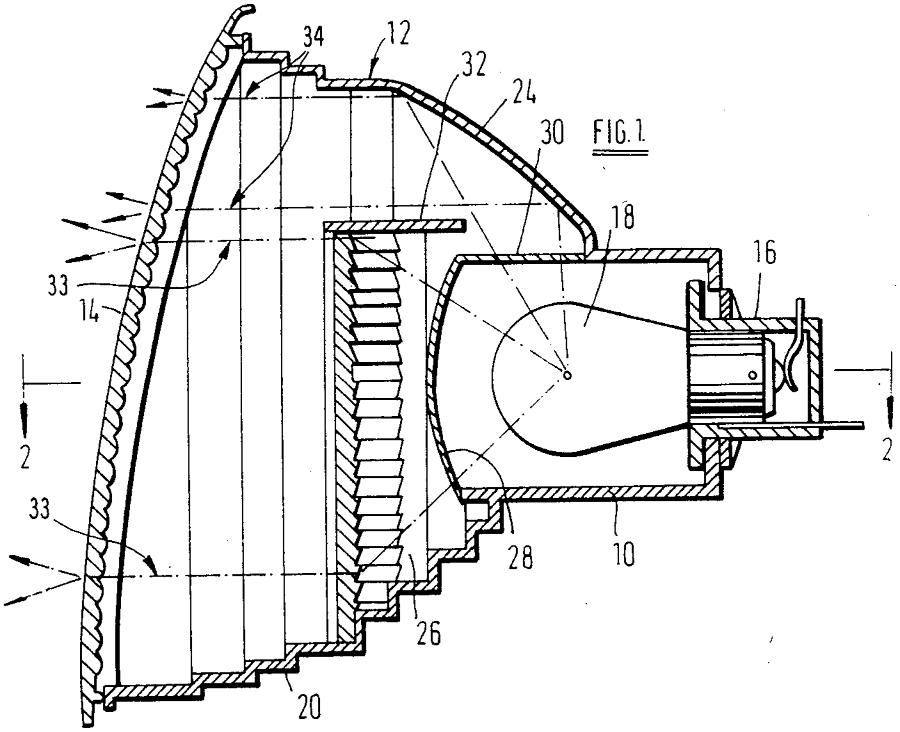

This invention relates to vehicle lamp assemblies of the type in which the colour of the light to be produced by the lamp cannot readily be perceived when the lamp is not illuminated and has particular but not exclusive application to the provision of a front direction indicator lamp which is to be mounted closely adjacent to a headlamp.

Our co-pending European Application No. 83303297.2 discloses a vehicle lamp assembly comprising a housing having an inner portion containing a light source and an outer portion having a lens arranged to collimate light from the light source and enclosed by a light transmitting cover element. The outer portion of the housing is separated from the inner portion by a colour filter and the outer portion has the inner surface of its side walls of stepped form so as to be either substantially parallel to or substantially perpendicular to the optical axis of the assembly. The collimated lens comprises co-axial inner and outer cylindrical surfaces located with the light source on their common axis, one cylindrical surface carrying elongate Fresnel prism formations of uniform cross-section extending parallel to the common axis and the other cylindrical surface carrying elongate Fresnel prism formations of constant cross-section extending in respective planes perpendicular to the common axis.

When a lamp assembly of the type described in the above-mentioned co-pending application is to be used as a front direction indicator lamp, it is required to appear substantially the same colour as the adjacent headlamp when off (i.e. white) and to appear amber when on. In addition, the intensity of light on the optical axis has to be sufficiently great to compete with the brightness of the headlamp. The present invention is concerned with increasing the on-axis brightness of a lamp assembly of this type without requiring a corresponding increase in the power of the light source.

According to the invention, a vehicle lamp assembly comprises a housing enclosed by a light transmitting cover element and having an inner portion containing a light source and an outer portion containing a lens and a reflector both arranged to collimate light from the light source parallel to a common optical axis, the reflector being arranged to direct the light collimated thereby past an edge of the lens, the outer portion of the housing being separated from the inner portion by colour filter means and the assembly being so constructed as to obstruct passage of light between the cover element and the colour filter except via the lens or via the reflector.

Preferably an opaque baffle extends from the edge of the lens round which light is directed by the reflector in a direction away from the cover element. The end of the baffle further from the lens preferably lies on the surface defined by the path of light from the light source to the edge of the reflector nearest to the cover element.

The interior of that part of the outer portion of the housing not forming the reflector preferably comprises side walls of stepped form arranged to be either substantially parallel or substantially perpendicular to the optical axis of the assembly.

It is preferable for the assembly to be oriented so that the reflector is above the lens. With this arrangement, any light incident on the reflector from outside the lamp assembly which is reflected back through the lens (and which therefore passes twice through the colour filter element), with the consequent risk of phantom indication, is directed towards the ground.

The lens may be a Fresnel lens of the type described in the above-mentioned co-pending application.

Figure 2:
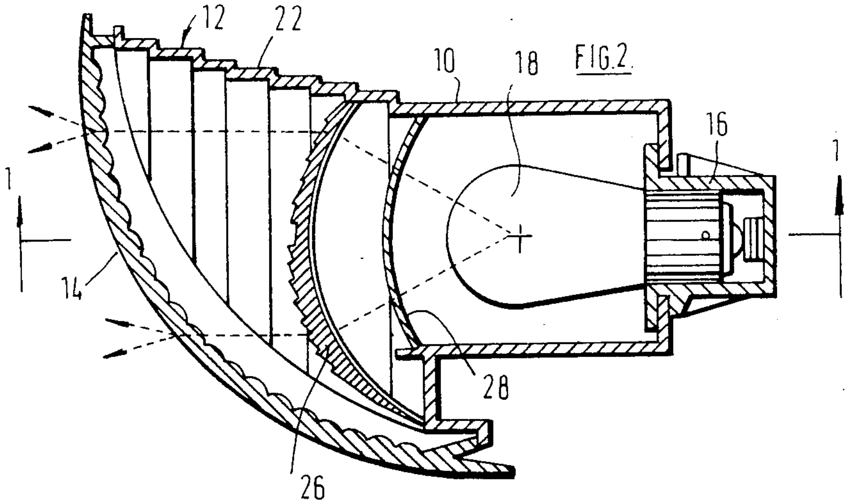

An embodiment of the invention will now be described, by way of example, with reference to the accompanying drawings, in which:

FIG. 1 is a vertical cross-sectional view of a lamp assembly in accordance with the invention, taken on the line 1—1 in FIG. 2; and FIG. 2 is a cross-sectional view taken on the line 2—2 in FIG. 1.

Referring to the drawings, a front direction indicator lamp assembly comprises a housing having an inner cylindrical portion 10 and an outer portion 12 which is closed by a clear cover element 14 having cnventional pillow optics on its inner surface. The inner portion 10 of the housing includes a bulb holder 16 supporting a bulb 18. The diameter of the inner portion 10 of the housing is chosen to be the minimum which will allow provision of the required cooling for the bulb 18.

The bottom 20 and side wall 22 of the outer portion 12 of the housing are of stepped formation, the inner surfaces of the steps being either parallel to or perpendicular to the axis of the cylindrical inner portion 10, which axis is the optical axis of the lamp. However, the upper wall 24 includes a portion forming a parabolic reflector with its focus coincident with the filament of the lamp 18 and its axis coincident with the axis of the cylindrical inner portion 10.

Located within the outer portion 12 of the housing, below the reflector 24, is a cylindrical lens 26, the axis of the cylinder passing through the filament of the bulb 18. The inner surface of the lens 26, i.e. the surface closer to the bulb 18, carries elongate Fresnel prism formations extending to respective planes perpendicular to the axis of the cylinder, while the outer surface carries Fresnel prism formations extending parallel to such axis.

An amber colour filter has a first portion 28 of the same diameter as the cylindrical portion 10 of the housing located at the front end thereof behind the lens 26, and a second portion 30 forming the top wall of the inner portion 10 of the housing below the reflector 24.

When the lamp is on, amber light is incident on the lens 26 by which it is collimated, as indicated by the rays 33. Light transmitted by the upper filter portion 30 is incident on the reflector 24 by which it is collimated as indicated by the rays 34. The lens 26 ensures that the whole of the outer cover element 14 is illuminated and the reflector 24 reinforces the on-axis beam which has to compete with the light from an adjacent headlamp.

An opaque baffle 32 is mounted on the top of the lens 26 and extends inwardly to the surface defined by the rays of light from the lamp 18 to the front edge of the reflector 24. This baffle 32 restricts the extent to which the upper part 30 of the colour filter is directly visible through the cover element 14. When the lamp is off, any light which is reflected by the reflector 24 through both parts 28 and 30 of the colour filter and back out through the lens 26 is directed downwardly towards the ground in close proximity to the lamp and consequently is not visible to drivers of other vehicles. The interior of the inner portion 10 of the housing is made of a light absorbing material so that no incident light is reflected therefrom.

I claim:

1. A vehicle lamp assembly comprising a housing enclosed by a light transmitting cover element and having an inner portion containing a light source and an outer portion containing a lens arranged to collimate light from the light source parallel to its optical axis, a reflector arranged to collimate light from the light source parallel to the optical axis and to direct the light collimated thereby past an edge of the lens, colour filter means separating the outer portion of the housing from the inner portion, and an opaque baffle extending from the edge of the lens round which light is directed by the reflector to a surface defined by the path of light from the light source to the edge of the reflector nearest to the cover element, the baffle obstructing passage of light between the cover element and the colour filter except via the lens or via the reflector.

2. A lamp assembly according to claim 1, wherein the lens comprises inner and outer cylindrical surfaces having a common axis perpendicular to the optical axis, the light source being located on said common axis, one of the cylindrical surfaces carrying elongated Fresnel prism formations of uniform cross-section extending parallel to the common axis and the other cylindrical surface carrying elongate Fresnel prism formations of constant cross-section extending in respective planes perpendicular to said common axis.

3. A lamp assembly according to claim 2, wherein the part of the walls of the outer portion of the housing which does not form the reflector has an inner surface which comprises a series of alternate first zones which are substantially parallel to the optical axis and second zones which are substantially perpendicular to the optical axis so that the dimensions of the outer portion in directions perpendicular to the optical axis increase from the end adjacent to the colour filter to the end enclosed by the cover element.

4. A vehicle lamp assembly comprising a housing enclosed by a light transmitting cover element and having an inner portion containing a light source and an outer portion containing a lens arranged to collimate light from the light source parallel to its optical axis, reflector arranged to collimate light from the light souce parallel to the optical axis and to direct the light collimated thereby past an edge of the lens, colour filter means separating the outer portion of the housing from the inner portion, and blocking means for obstructing passage of light between the cover element and the colour filter except via the lens or via the reflector; the part of the walls of the outer portion of the housing which does not form the reflector having an inner surface which comprises a series of alternate first zones which are substantially parallel to the optical axis and second zones which are substantially perpendicular to the optical axis so that the dimensions of the outer portion in directions perpendicular to the optical axis increase from the end adjacent to the colour filter to the end enclosed by the cover element.

5. A lamp assembly according to claim 4, wherein the blocking means comprises an opaque baffle extending from the edge of the lens round which light is directed by the reflector to a surface defined by the path of light from the light source to the edge of the reflector nearest to the cover element.

6. A lamp assembly according to claim 4, wherein the lens comprises inner and outer cylindrical surfaces having a common axis perpendicular to the optical axis, the light source being located on said common axis, one of the cylindrical surfaces carrying elongated Fresnel prism formations of uniform cross-section extending parallel to the common axis and the other cylindrical surface carrying elongate Fresnel prism formations of constant cross-section extending in respective planes perpendicular to said common axis.

7. A vehicle lamp assembly comprising a housing enclosed by a light transmitting cover element and having an inner portion containing a light source and an outer portion containing a lens arranged to collimate light from the light source parallel to its optical axis, a reflector arranged to collimate light from the light source parallel to the optical axis and to direct the light collimated thereby past an edge of the lens, colour filter means separating the outer portion of the housing from the inner portion, and blocking means for obstructing passage of light between the cover element and the colour filter except via the lens or via the reflector; the lens comprising inner and outer cylindrical surfaces having a common axis perpendicular to the optical axis, the light source being located on said common axis, one of the cylindrical surfaces carrying elongated Fresnel prism formations of uniform cross-section extending parallel to the common axis and the other cylindrical surface carrying elongate Fresnel prism formations of constant cross-section extending in respective planes perpendicular to said common axis.

* * * * *